L. G. MARKS.
VEHICLE TIRE AND PROCESS OF PRODUCING SAME.
APPLICATION FILED JUNE 11, 1917.
1,250,920.
Patented Dec. 18, 1917.
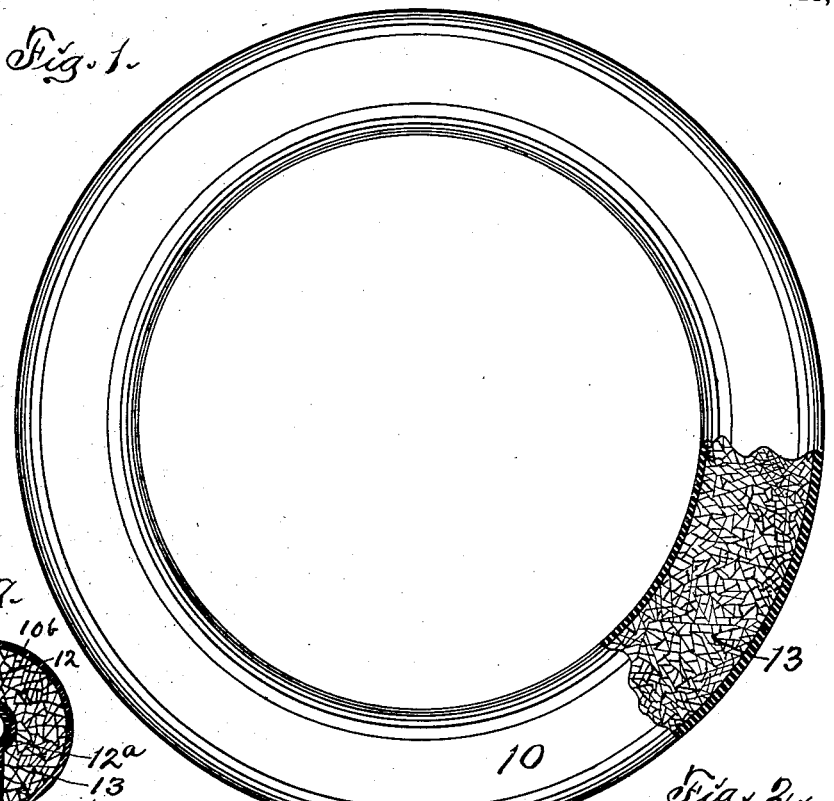
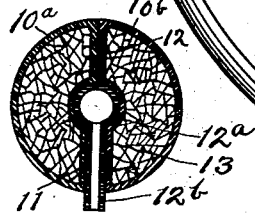
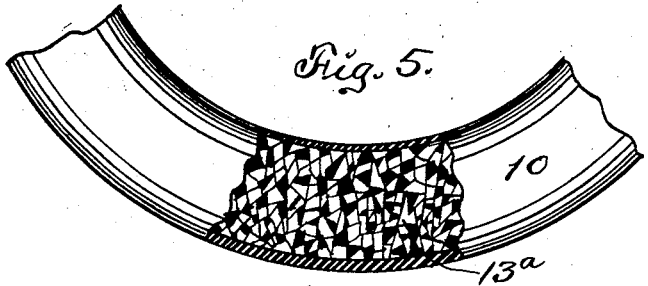
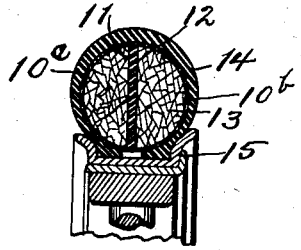
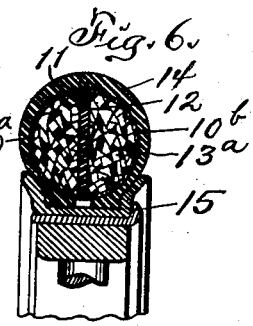
Inventor:
(Mrs) Lourissa G. Marks
By Silas L. Sweet
Atty

UNITED STATES PATENT OFFICE.

LOURISSA G. MARKS, OF PERRY, IOWA.

VEHICLE-TIRE AND PROCESS OF PRODUCING SAME.

1,250,920.  Specification of Letters Patent.  Patented Dec. 18, 1917.

Application filed June 11, 1917. Serial No. 173,947.

*To all whom it may concern:*

Be it known that I, (Mrs.) LOURISSA G. MARKS, a citizen of the United States of America, and resident of Perry, in the county of Dallas and State of Iowa, have invented a new and useful Vehicle-Tire and Process of Producing Same, of which the following is a specification.

The object of my invention is to provide a vehicle tire which will be non-deflatable when the tire is punctured, will not explode or blow out, will not bounce unduly in use, and will have maximum resilience and lasting quality.

A further object of my invention is to provide a cushioned or filled tire or insert for tire casings, which may be formed and vulcanized separate from and interposed in suitable tread and traction casings and provide, in use, maximum resilience and lasting quality.

My invention consists in the article of manufacture hereinafter set forth and claimed, adapted to be employed with casings on wheels of vehicles.

My invention consists further in the construction, arrangement and combination of elements hereinafter set forth, pointed out in my claims and illustrated by the accompanying drawing, in which—

Figure 1 is a side elevation, partly in section, of one of the tire inserts embodying my invention. Fig. 2 is a cross-section showing the insert in association with a casing and rims in position for practical use. Fig. 3 is a cross-section illustrating steps in the construction of the insert. Fig. 4 is a cross-section illustrating a further step in the construction or manufacture of the insert.

Fig. 5 is an elevation, partly in section, of a segment of an insert embodying my invention and slightly modified as to composition and attributes. Fig. 6 is a cross-section showing the latter insert in association with other elements.

Fig. 7 is a cross-section on an enlarged scale, illustrating a further modification of my improved construction involving the use of an air tube in the center of the tire.

In the construction of the device as shown the numeral 10 designates an inner tube, which may be made of rubber or fabric. When of rubber the inner tube 10 preferably is made of mating parts $10^a$, $10^b$, each semi-circular in cross-section (Figs. 3 and 4) and flat partition members 11, 12, also of rubber. The mating members $10^a$, $10^b$ are separately molded of raw rubber; the flat partitions 11, 12 are separately formed of raw rubber; the mating members are filled with a suitable substance, such as ground cork or cork broken into relatively small pieces 13; the partition members are placed in contact with the filling substance and overlap the margins of the mating members; then the filled mating members, carrying the partition members, are brought together in a mold (not shown) in such manner as to contact the partition members with each other and safely inclose the filling substance; and then the rubber parts, inclosed in the mold, are vulcanized. The insert having its rubber parts vulcanized so as to provide homogeneity of union and wholly inclosing the filling substance 13 in two chambers side by side, may be stored and transported as units and, when desired for use, may be mounted in any suitable casing 14 and be mounted on any suitable rim 15. Any desired and suitable rim may be employed, preferably having the functions of wholly inclosing, retaining and locating the insert.

In Figs. 5 and 6 the filling substance $13^a$ preferably is composed of ground cork or cork broken into relatively small pieces saturated by and having the interstices or voids between the pieces filled with a bond of melted raw or vulcanized rubber, the latter being shown by the irregular black spots in the drawing. When this filler is employed and the bond is of raw rubber, said bond is vulcanized during the operation of vulcanizing the other rubber parts as above described.

It is desirable at times to provide means for ventilating the interior of the insert by the circulation or travel of air through it and to that end, I show in Fig. 7 an annular rubber tube $12^a$ having a valve-stem $12^b$ communicating therewith and leading radially therefrom. The tube $12^a$ may be separately formed as shown and be disposed between the partition members 11, 12 before the operation of vulcanizing and be vulcanized at the same time as the other parts, or, said tube may be formed as a part of the partition members during the operation of molding. In either event the tube $12^a$ and the valve-stem $12^b$ provides means for the circulation of air through the center of the tire insert during the use and operation of the tire. Also the tube 12ª will have a cushioning function in the insert.

The use of the insert, constructed in any of the ways described, or in any similar way, with a rim and casing, provides a tire which will not deflate when the casing and inner tube are punctured, will not explode or blow out, will not bounce unduly, and will have maximum resilience and lasting quality. Any compression of the insert under a load in use is absorbed in the compressibility of the fragments of cork, augmented by the bond when employed, and further augmented by the air tube 12ª when employed, and by the inner tube and partition members.

The insert is compressed in the mold, during the process of manufacture, so as to resist external pressure in use to the desired degree.

The filler of cork alone will creep or roll under traction and pressure of a roadway on the casing and will yield quickly and respond or react gradually under impact, thus making for smooth travel and avoiding bouncing of the tires or vehicle over bumps or rough roads.

A similar effect, with less creep, is noticeable in the use of cork filling saturated with a bond such as rubber.

Also, under some circumstances, the insert considered as a unit, will creep in the casing to some extent.

I claim as my invention—

1. A tire insert composed of a rubber tube formed in mating members, each member being filled with comminuted cork, rubber partitions being arranged between the members and overlaying the filling therein, said constituents being compressed conjunctively in a mold and the rubber parts thereof being vulcanized to homogeneous union.

2. A tire insert, composed of a rubber tube formed in mating members, each member being filled with comminuted cork, and a saturating interstice or void filling bond, rubber partitions being arranged between the members and overlaying the filling therein, said constituents being compressed conjunctively in a mold and the rubber parts thereof being vulcanized to homogeneous union.

3. A tire insert, composed of a rubber tube formed in mating members, each member being filled with comminuted cork and a bond such as rubber, rubber partitions being arranged between the members and overlaying the filling therein, said constituents being compressed conjunctively in a mold and the rubber parts thereof being vulcanized.

4. A vehicle tire comprising a casing and an insert composed of a rubber tube having a rubber partition, said rubber parts of the insert being vulcanized to homogeneous union, the insert having a filling of intimately related comminuted cork and a bond such as rubber.

5. A vehicle tire comprising a casing and an insert composed of a rubber tube having a rubber partition, an annular air tube being formed centrally of said partition, there being means of communication between said air tube and the external atmosphere, said rubber parts of the insert being vulcanized to homogeneous union, the insert having a filling of comminuted cork.

6. A vehicle tire comprising a casing and and an insert composed of a rubber tube having a rubber partition, an annular air tube being formed centrally of said partition, there being means of communication between said air tube and the external atmosphere, said rubber parts of the insert being vulcanized to homogeneous union, the insert having a filling of intimately related comminuted cork and a bond such as rubber.

7. The process of making an insert for vehicle tires of cushioned or resilient non-pneumatic type, which process consists of molding separately mating rubber tube members, semicircular in cross-section, then filling the cavities of said members with comminuted cork, then overlaying chord faces of said members and the filling with flat sheets of rubber, then compressing said constituents in a mold, and then subjecting the constituents collectively to heat to the end of vulcanizing the rubber parts thereof.

Mrs. LOURISSA G. MARKS.